United States Patent
Vanness

(10) Patent No.: US 7,221,688 B2
(45) Date of Patent: May 22, 2007

(54) METHOD AND APPARATUS FOR RECEIVING A DIGITAL AUDIO BROADCASTING SIGNAL

(75) Inventor: Philip H. Vanness, Clinton, NJ (US)

(73) Assignee: iBiquity Digital Corporation, Columbia, MD (US)

(*) Notice: Subject to any disclaimer, the term of this patent is extended or adjusted under 35 U.S.C. 154(b) by 1181 days.

(21) Appl. No.: 10/210,143

(22) Filed: Jul. 31, 2002

(65) Prior Publication Data

US 2004/0022229 A1 Feb. 5, 2004

(51) Int. Cl.
*H04J 3/00* (2006.01)
(52) U.S. Cl. .................. 370/529; 370/487; 375/350
(58) Field of Classification Search .............. 370/529, 370/430, 419, 463, 486, 487; 455/266, 552, 455/61; 375/216, 350, 316; 708/316
See application file for complete search history.

(56) References Cited

U.S. PATENT DOCUMENTS

| | | | |
|---|---|---|---|
| 5,278,826 A | 1/1994 | Murphy et al. | 370/343 |
| 5,278,844 A | 1/1994 | Murphy et al. | 714/778 |
| 5,315,583 A | 5/1994 | Murphy et al. | 370/312 |
| 5,339,455 A | 8/1994 | Vogt et al. | 455/266 |
| 5,341,431 A | 8/1994 | Griessman et al. | 381/1.5 |
| 5,345,603 A | 9/1994 | Laffont | 455/139 |
| 5,369,800 A | 11/1994 | Takagi et al. | 455/59 |
| 5,465,396 A | 11/1995 | Hunsinger et al. | 455/61 |
| 5,465,410 A | 11/1995 | Hiben et al. | 455/266 |
| 5,668,837 A * | 9/1997 | Dent | 375/316 |
| 5,745,856 A | 4/1998 | Dent | 455/552.1 |
| 5,777,911 A * | 7/1998 | Sherry et al. | 708/316 |
| 5,949,796 A | 9/1999 | Kumar | 370/529 |
| 6,014,407 A | 1/2000 | Hunsinger et al. | 375/140 |

(Continued)

OTHER PUBLICATIONS

"System for Digital Sound Broadcasting in the Broadcasting Bands Below MHz," Draft New Recommendation ITU-R BS, International Telecommunication Union, Radiocommunication Study Groups, Oct. 25, 2000, pp. 1-30.

*Primary Examiner*—John Pezzlo
(74) *Attorney, Agent, or Firm*—Robert P. Lenart, Esq.; Pietragallo Bosick & Gordon LLP

(57) ABSTRACT

A method for processing a composite digital audio broadcasting signal including an analog modulated portion in a central frequency band and digitally modulated portions in upper and lower sidebands with respect to the central frequency band, the method comprises the steps of wideband filtering the composite digital audio broadcasting signal to produce a first intermediate frequency signal, narrowband filtering the composite digital audio broadcasting signal to produce a second intermediate frequency signal, simultaneously processing the first intermediate frequency signal to retrieve a digitally modulated version of program material from the first intermediate frequency signal, and processing the second intermediate frequency signal to retrieve an analog modulated version of the program material from the second intermediate frequency signal, making a determination of the quality of the digitally modulated version of the program material, and using the quality determination to select the analog modulated version of the program material, the digitally modulated version of the program material, or a combination of the analog modulated version of the program material and the digitally modulated version of the program material as an output signal. Receivers that process a digital audio broadcasting signal using the method are also disclosed.

11 Claims, 3 Drawing Sheets

U.S. PATENT DOCUMENTS

| | | | |
|---|---|---|---|
| 6,055,619 A | 4/2000 | North et al. | 712/36 |
| 6,088,569 A | 7/2000 | Bach et al. | 725/149 |
| 6,108,810 A | 8/2000 | Kroeger et al. | 714/790 |
| 6,178,211 B1 | 1/2001 | Whikehart et al. | 375/350 |
| 6,178,317 B1 | 1/2001 | Kroeger et al. | 455/296 |
| 6,256,358 B1 | 7/2001 | Whikehart et al. | 375/316 |
| 6,285,865 B1 | 9/2001 | Vorenkamp et al. | 455/307 |
| 6,307,599 B1 | 10/2001 | Komatsu | 348/731 |

* cited by examiner

US 7,221,688 B2

METHOD AND APPARATUS FOR RECEIVING A DIGITAL AUDIO BROADCASTING SIGNAL

FIELD OF THE INVENTION

This invention relates to radio frequency signal reception and, more particularly, to methods of and apparatus for receiving digital audio broadcasting signals.

BACKGROUND OF THE INVENTION

Digital Audio Broadcasting (DAB) is a medium for providing digital quality audio, superior to existing analog broadcasting formats. FM In-Band On-Channel (IBOC) DAB can be transmitted in a hybrid format where the digitally modulated signal coexists with the currently broadcast analog FM signal, or in an all-digital format where the analog FM signal has been eliminated. IBOC requires no new spectral allocations because each DAB signal is transmitted within the spectral mask of an existing FM channel allocation. IBOC promotes economy of spectrum while enabling broadcasters to supply digital quality audio to their present base of listeners.

FM DAB systems have been the subject of several United States patents including Pat. Nos. 6,108,810; 5,949,796; 5,465,396; 5,315,583; 5,278,844 and 5,278,826. In an FM compatible digital audio broadcasting system, digitally encoded audio information is transmitted simultaneously with the existing analog FM signal channel. The advantages of digital transmission for audio include better signal quality with less noise and wider dynamic range than with existing FM radio channels. Initially the hybrid format would be used allowing existing receivers to continue to receive the analog FM signal while allowing new IBOC DAB receivers to also decode the digital signal. Some time in the future, when IBOC DAB receivers are abundant, broadcasters may elect to transmit the all-digital format. Hybrid IBOC DAB can provide virtual CD-quality stereo digital audio (plus data) while simultaneously transmitting the existing FM signal. All-digital IBOC DAB can provide virtual CD-quality stereo or multichannel audio along with an increased data channel.

One proposed FM IBOC DAB signal places orthogonal frequency division multiplexed (OFDM) subcarriers in the region from about 129 kHz to 199 kHz away from the FM center frequency, both above and below the spectrum occupied by an analog modulated host FM carrier. Some IBOC options permit subcarriers starting as close as 100 kHz away from the center frequency. The bandwidth of the existing analog FM signal is significantly smaller than the bandwidth occupied by the OFDM subcarriers. One concern involves how to allow the larger bandwidth OFDM signal into the radio while still maintaining the existing analog performance.

U.S. Pat. No. 6,178,317, which is hereby incorporated by reference, discloses a system for mitigating intermittent interruptions in a digital audio broadcasting system. The system includes a receiver for receiving a primary radio signal and a delayed redundant radio signal, demodulating the primary radio signal to provide the audio signal to a first output, and demodulating the delayed redundant radio signal to provide a second output. The receiver further includes a circuit for detecting degradation of at least one of the received signal components and a blending circuit for combining the primary audio signal and the redundant audio signal to form a composite audio signal. Additionally, the receiver includes an audio output circuit coupled to the blending circuit for converting the composite audio signal to an audible signal.

There is a need for an IBOC DAB receiver that can process an IBOC DAB signal in a manner that permits the blending and/or selection of the analog and/or the digital signal, without adversely affecting the analog signal path, for example so that the receiver can receive analog signals from broadcasters that have not yet switched to digital audio broadcasting without any performance impairment. One approach would be to use two switchable radio frequency filters in the radio tuner. One wideband filter (500 kHz) would be used for the digitally modulated OFDM signal and another narrowband filter would be used for the analog (180 kHz) signal. However, switching between the two filters can degrade the analog path. Such degradation in the analog path is not acceptable.

Alternatively, the larger bandwidth digitally modulated signal could be used until the blend to analog command is received. At this time a narrowband filter would be switched in. This could improve the analog performance but would filter out most of the digitally modulated signal. The main problem here is that with the narrowband filter in place, the digitally modulated signal is so limited that there is no way to determine when the digitally modulated signal is good enough to transition back to digital mode.

U.S. Pat. No. 6,178,317 discloses a digital audio broadcasting receiver having a front end that delivers intermediate frequency signals to each of two demodulators. However, U.S. Pat. No. 6,178,317 does not disclose any details of how the intermediate frequency signals are obtained.

This invention seeks to provide a method and apparatus for receiving an IBOC DAB signal, but does not impact the analog performance.

SUMMARY OF THE INVENTION

The present invention provides a method for processing a composite digital audio broadcasting signal including an analog modulated portion in a central frequency band and digitally modulated portions in upper and lower sidebands with respect to the central frequency band, the method comprises the steps of wideband filtering the composite digital audio broadcasting signal to produce a first intermediate frequency signal, narrowband filtering the composite digital audio broadcasting signal to produce a second intermediate frequency signal, simultaneously processing the first intermediate frequency signal to retrieve a digitally modulated version of program material from the first intermediate frequency signal, and processing the second intermediate frequency signal to retrieve an analog modulated version of the program material from the second intermediate frequency signal, making a determination of the quality of the digitally modulated version of the program material, and using the quality determination to select the analog modulated version of the program material, the digitally modulated version of the program material, or a combination of the analog modulated version of the program material and the digitally modulated version of the program material as an output signal.

The step of wideband filtering can produce a first filtered signal, which is subsequently narrowband filtered to produce the second intermediate frequency signal. The first and second intermediate frequency signals can be processed in independent signal paths in a signal processor.

The step of making a determination of the quality of the digitally modulated version of the program material can include the step of determining the bit error rate of the digitally modulated version of the program material, or the step of making a channel quality estimate of the digitally modulated portions of the digital audio broadcasting signal.

The invention also encompasses a receiver for processing a composite digital audio broadcasting signal, the receiver comprising a first filter for wideband filtering the composite digital audio broadcasting signal to produce a first intermediate frequency signal, a second filter for narrowband filtering the composite digital audio broadcasting signal to produce a second intermediate frequency signal, and processing means for retrieving a digitally modulated version of program material from the first intermediate frequency signal, retrieving an analog modulated version of the program material from the second intermediate frequency signal, making a determination of the quality of the digitally modulated version of the program material, and using the quality determination to select the analog modulated version of the program material, the digitally modulated version of the program material, or a combination of the analog modulated version of the program material and the digitally modulated version of the program material as an output signal.

The first and second filters can be electrically connected in series with each other. The processing means can include a first analog to digital converter for converting the first intermediate frequency signal from the wideband filter into a first digital signal, and a second analog to digital converter for converting the second intermediate frequency signal from the narrowband filter into a sampled audio signal.

The processing means can further include a chip set for processing the first digital signal and for making the determination of the quality of the digitally modulated version of the program material.

More generally the invention also encompasses a receiver for processing a composite digital audio broadcasting signal including an analog modulated portion in a central frequency band and digitally modulated portions in upper and lower sidebands with respect to the central frequency band, the receiver comprising means for wideband filtering the composite digital audio broadcasting signal to produce a first intermediate frequency signal, means for narrowband filtering the composite digital audio broadcasting signal to produce a second intermediate frequency signal, and means for retrieving a digitally modulated version of program material from the first intermediate frequency signal, retrieving an analog modulated version of the program material from the second intermediate frequency signal, making a determination of the quality of the digitally modulated version of the program material, and using the quality determination to select the analog modulated version of the program material, the digitally modulated version of the program material, or a combination of the analog modulated version of the program material and the digitally modulated version of the program material as an output signal.

DETAILED DESCRIPTION OF THE INVENTION

Figure 1:
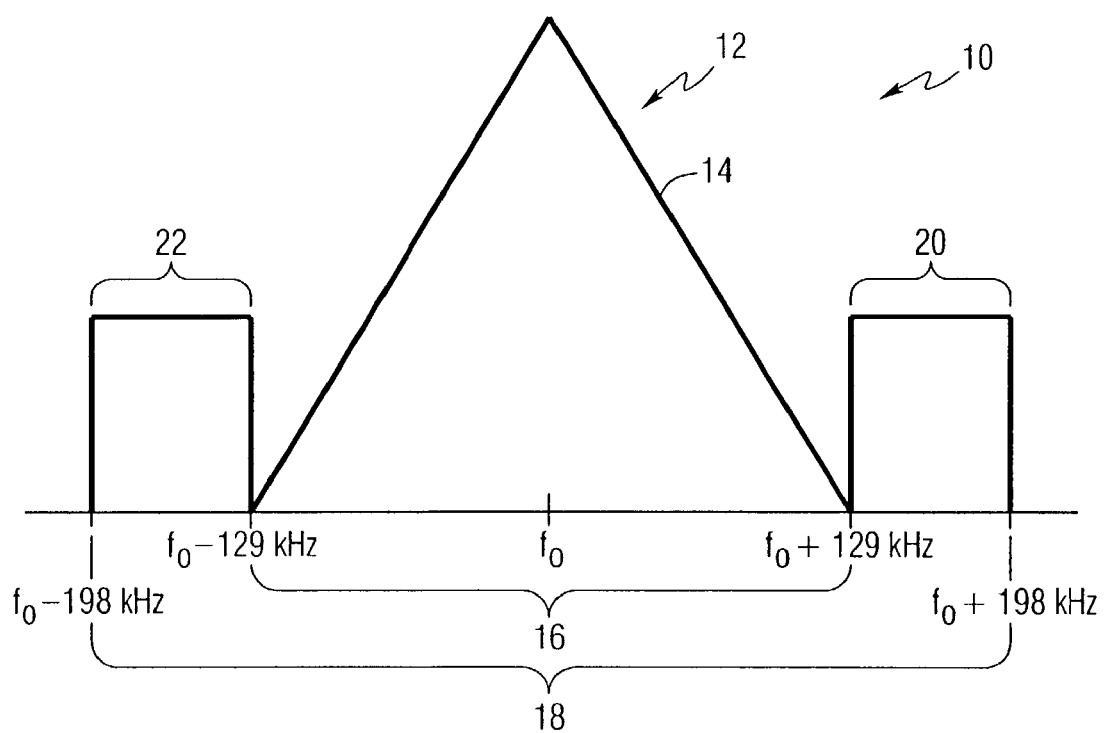
FIG. 1 is a diagrammatic representation of an in-band on-channel composite digital audio broadcasting signal, which can be processed using the method and receivers of the present invention.

Referring to the drawings, FIG. 1 illustrates an In-Band On-Channel (IBOC) Digital Audio Broadcasting (DAB) signal 10 including a conventional FM stereo analog signal 12 having a power spectral density represented by the triangular shape 14 generally positioned in a central, or central frequency band portion 16 of an FM-band channel 18. The Power Spectral Density (PSD) of a typical analog FM broadcast signal is nearly triangular with a slope of about −0.35 dB/kHz from the center frequency. A plurality of digitally modulated evenly spaced subcarriers are positioned on either side of the analog FM signal, in an upper sideband 20 and a lower sideband 22, and are transmitted concurrently with the analog FM signal. In this example, the central frequency band has a bandwidth of about 260 kHz and the channel has a bandwidth of about 400 kHz.

Figure 2:
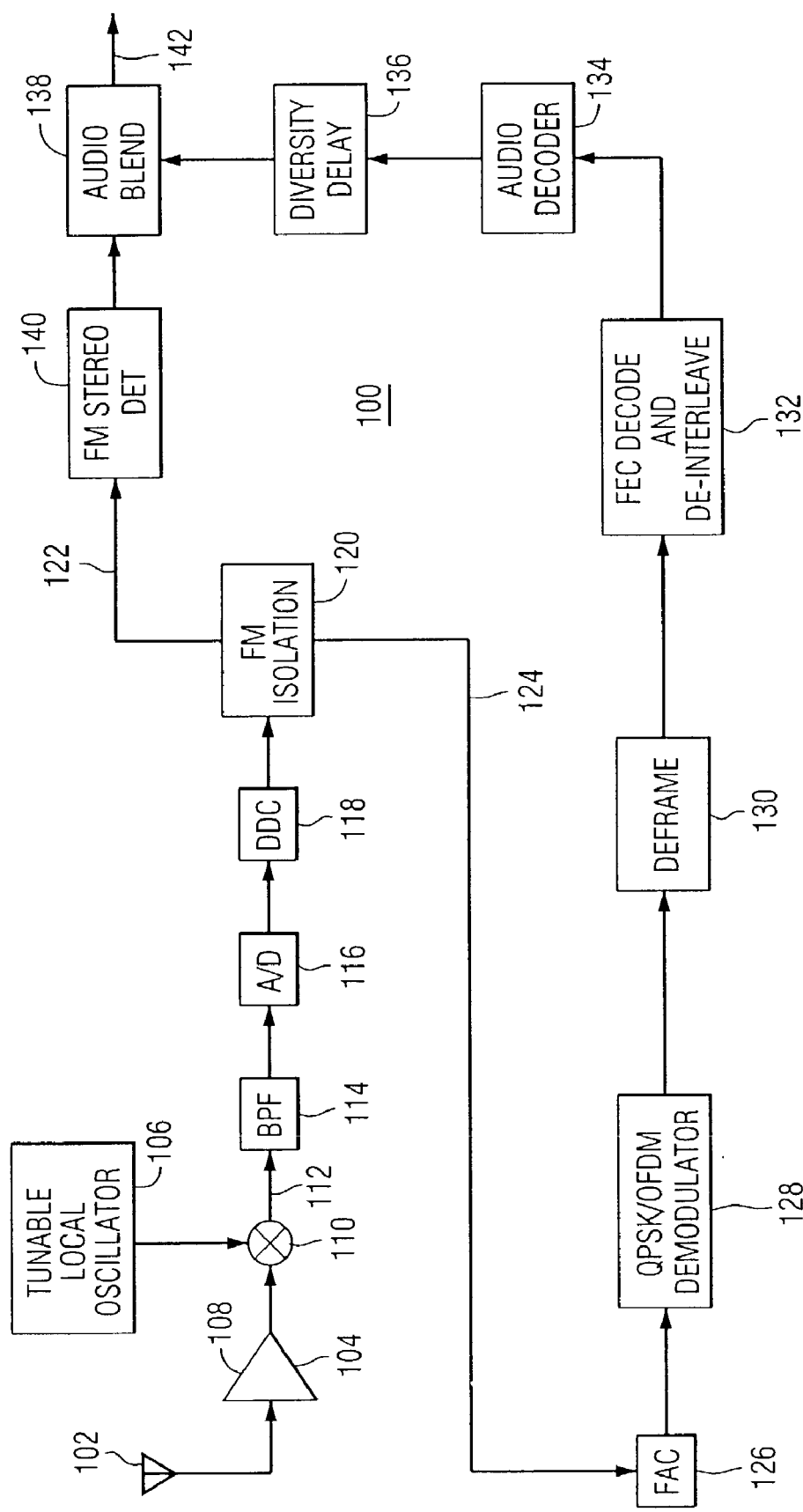
FIG. 2 is a block diagram of a receiver that can perform the signal processing method of this invention.

FIG. 2 is a simplified block diagram of a receiver 100 constructed to receive the composite digital and analog signals of FIG. 1. An antenna 102 receives the composite waveform containing the digital and analog signals and passes the signal to a conventional radio frequency front end stage 104. A local oscillator 106 produces a signal that is mixed with a radio frequency signal on line 108 by mixer 110 to produce an intermediate frequency signal on line 112. This intermediate frequency signal is filtered by a bandpass filter 114, converted to a digital signal in an analog to digital converter 116 converted to a sampled analog signal and a digital signal by a digital down converter 118. An FM isolation circuit 120 separates the composite signal into a sampled analog modulated signal on line 122 and a sampled composite signal on line 124. The composite digital signal is then processed to remove first adjacent interferers, demodulated, deframed, de-interleaved and decoded as illustrated by blocks 126, 128, 130, 132 and 134. The decoded signal is then delayed as illustrated by block 136 and blended, as shown in block 138 with an analog signal that was produced by demodulating the sampled analog modulated signal in an FM stereo detector 140. The resulting signal on line 142 is then passed to a suitable output circuit such as a power amplifier which is used to drive an output device that may include a speaker and/or a display. In a practical receiver, many of the functions shown in FIG. 2 can be performed in one or more digital signal processors or application specific integrated circuits.

Figure 3:
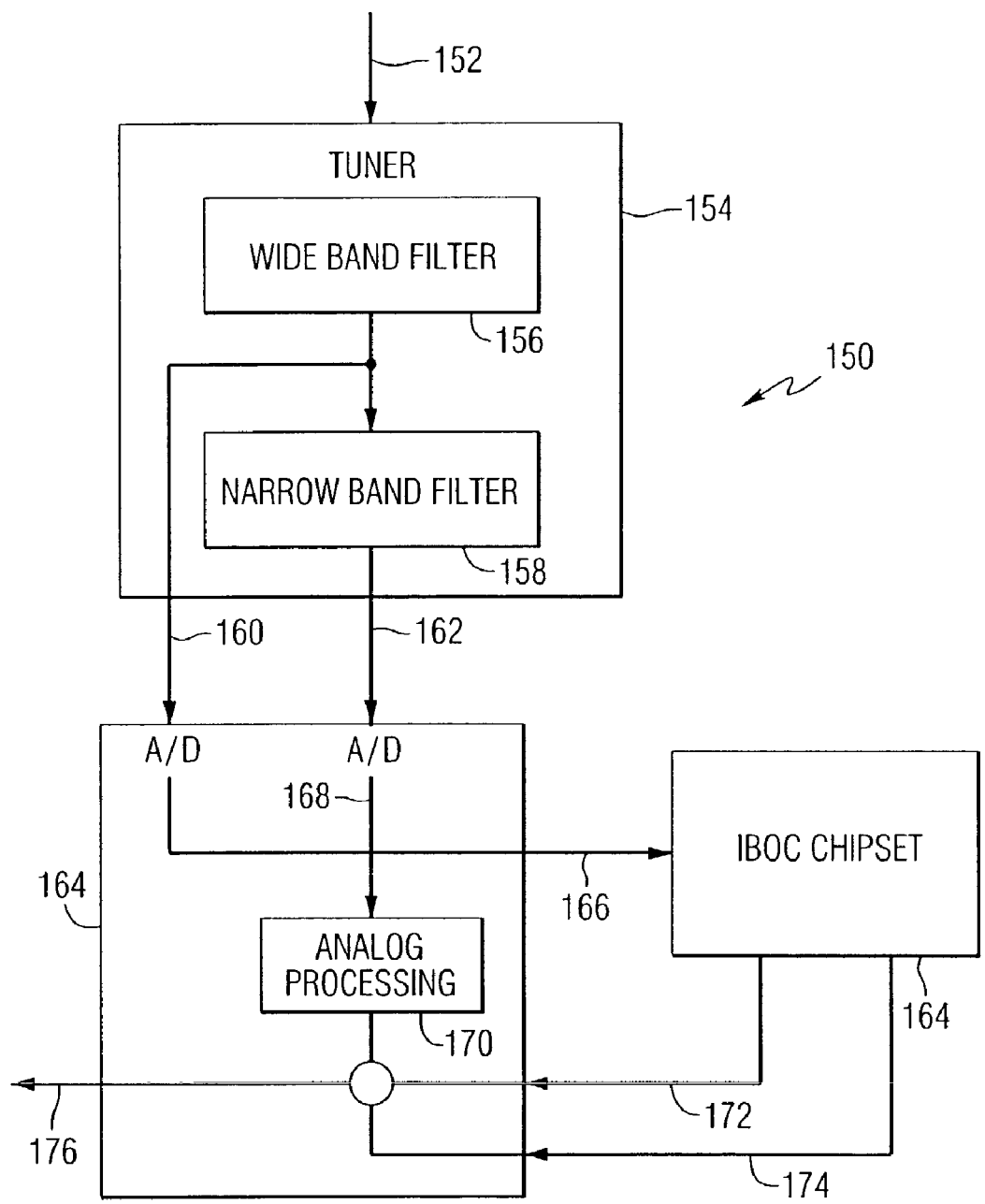
FIG. 3 is a simplified block diagram of another receiver that can perform the signal processing method of this invention.

FIG. 3 is a simplified block diagram of a receiver 150 constructed in accordance with this invention. A signal is received on line 152 and input to a tuner 154 that includes first and second filters 156 and 158. The filters are connected in series. The first filter is a wideband filter, while the second filter is a narrowband filter. The wideband filter is a bandpass filter having a passband, of for example 500 kHz, that is wide enough to include the entire composite signal as illustrated in FIG. 1. The narrowband filter is a bandpass filter having a passband, of for example 180 kHz, that is wide enough to include the analog modulated signal portion of the composite signal of FIG. 1. The wideband filter is used to produce a first intermediate frequency signal on line 160 and the narrowband filter is used to produce a second intermediate frequency signal on line 162. The first and second intermediate frequency signals are input to a signal processor where they are subjected to further processing. The first intermediate frequency signal on line 160 is digitized to form a first series of in-phase and quadrature signals that are delivered to an in-band on-channel chip set 164 on line 166. The second intermediate frequency signal is also digitized to produce a second series of in-phase and quadrature signals on line 168 that are subjected to analog processing as illustrated by block 170. The in-band on-channel chip set 164 performs the required signal processing as illustrated in the digital signal path of the receiver of FIG. 2, and produces an output signal on line 172 that is representative of the digital signal and a blend control signal on line 174. The digital and analog signals are then blended in accordance with the blend control signal to produce an output signal on line 176.

Signal processors for use in radio receivers having dual IF inputs have been used for diversity applications where two tuners are involved. However, in the present invention the two IF channels act independently, with one being used as a digital signal input with a wide bandwidth and the other being used as an analog signal input with narrow bandwidth.

For example, the processor can be set up for a non-diversity (single tuner) operation while still allowing both IF channels to be processed. Then the IF path that is not used for the analog path can be sent to the IBOC chip set for processing. The blend command issued from the IBOC chip set would control whether the radio's output was from the analog or digital path. In this situation, both the analog and digital processing paths would always receive their desired inputs. No switching or compensation between filters is needed.

The tuner provides both a wideband and narrowband filter output. This invention provides a method and apparatus for receiving a composite IBOC DAB signal that includes a wideband OFDM signal, but does not impact the analog performance.

The described receivers process a composite digital audio broadcasting signal including an analog modulated portion in a central frequency band and digitally modulated portions in upper and lower sidebands with respect to the central frequency band, using a method comprising the steps of wideband filtering the composite digital audio broadcasting signal to produce a first intermediate frequency signal, narrowband filtering the composite digital audio broadcasting signal to produce a second intermediate frequency signal, simultaneously processing the first intermediate frequency signal to retrieve a digitally modulated version of program material from the first intermediate frequency signal, and processing the second intermediate frequency signal to retrieve an analog modulated version of the program material from the second intermediate frequency signal, making a determination of the quality of the digitally modulated version of the program material, and using the quality determination to select the analog modulated version of the program material, the digitally modulated version of the program material, or a combination of the analog modulated version of the program material and the digitally modulated version of the program material as an output signal.

The determination of the digital signal quality can be made by determining the Bit Error Rate (BER) or a Channel Quality Estimation of the digital portion of the signal. Certain error correction codes are embedded in the digital signal which would allow this determination. When the error rate or channel quality exceeds a predetermined limit, the blend signal would be activated to switch the audio from digital to analog. When the error rate decreases, the blend signal would become inactive and the audio would revert to the digital IBOC audio. Since both the analog and digital signals are being decoded simultaneously (through the two different filters in parallel), this switch between the audio could be made fairly easily.

If the filters were connected in series with only one output, when the error rate is high, the second filter could be switched in to improve the analog. However, that would remove the digital signal and therefore the determination of when the error rate had improved could not be made. This invention avoids this problem by using two different filters in parallel.

While the invention has been described in terms of various embodiments, it should be understood that various modifications could be made to the disclosed embodiments without departing from the scope of the invention as defined by the following claims.

What is claimed is:

1. A method for processing a composite digital audio broadcasting signal including an analog modulated portion in a central frequency band and digitally modulated portions in upper and lower sidebands with respect to the central frequency band, the method comprising the steps of:
    wideband filtering the composite digital audio broadcasting signal to produce a first intermediate frequency signal;
    narrowband filtering the composite digital audio broadcasting signal to produce a second intermediate frequency signal;
    simultaneously processing the first intermediate frequency signal to retrieve a digitally modulated version of program material from the first intermediate frequency signal, and processing the second intermediate frequency signal to retrieve an analog modulated version of the program material from the second intermediate frequency signal;
    making a determination of the quality of the digitally modulated version of the program material; and
    using the quality determination to select the analog modulated version of the program material, the digitally modulated version of the program material, or a combination of the analog modulated version of the program material and the digitally modulated version of the program material as an output signal.

2. The method of claim 1, wherein the step of wideband filtering the composite digital audio broadcasting signal to produce a first intermediate frequency signal produces a first filtered signal, and wherein the step of narrowband filtering the composite digital audio broadcasting signal to produce a second intermediate frequency signal filters the first filtered signal to produce the second intermediate frequency signal.

3. The method of claim 1, wherein the step of simultaneously processing the first intermediate frequency signal to retrieve a digitally modulated version of the program material from the first intermediate frequency signal, and processing the second intermediate frequency signal to retrieve an analog modulated version of the program material from the second intermediate frequency signal, processes the first and second intermediate frequency signals in independent signal paths.

4. The method of claim 1, wherein the step of making a determination of the quality of the digitally modulated version of the program material comprises the step of:
    determining the bit error rate of the digitally modulated version of the program material.

5. The method of claim 1, wherein the step of making a determination of the quality of the digitally modulated version of the program material comprises the step of:
    making a channel quality estimate of the digitally modulated portions of the digital audio broadcasting signal.

6. A receiver for processing a composite digital audio broadcasting signal, the receiver comprising:

a first filter for wideband filtering the composite digital audio broadcasting signal to produce a first intermediate frequency signal;

a second filter for narrowband filtering the composite digital audio broadcasting signal to produce a second intermediate frequency signal; and processing means for retrieving a digitally modulated version of program material from the first intermediate frequency signal, retrieving an analog modulated version of the program material from the second intermediate frequency signal, making a determination of the quality of the digitally modulated version of the program material, and using the quality determination to select the analog modulated version of the program material, the digitally modulated version of the program material, or a combination of the analog modulated version of the program material and the digitally modulated version of the program material as an output signal.

7. A receiver according to claim 6, wherein the first and second filters are electrically connected in series with each other.

8. A receiver according to claim 6, wherein the processing means includes:

a first analog to digital converter for converting the first intermediate frequency signal from the wideband filter into a first digital signal, and a second analog to digital converter for converting the second intermediate frequency signal from the narrowband filter into a sampled audio signal.

9. A receiver according to claim 8, wherein the processing means further includes:

a chip set for processing the first digital signal and for making the determination of the quality of the digitally modulated version of the program material.

10. A receiver according to claim 9, wherein the chip set further includes means for producing a blend control signal.

11. A receiver for processing a composite digital audio broadcasting signal including an analog modulated portion in a central frequency band and digitally modulated portions in upper and lower sidebands with respect to the central frequency band, the receiver comprising:

means for wideband filtering the composite digital audio broadcasting signal to produce a first intermediate frequency signal;

means for narrowband filtering the composite digital audio broadcasting signal to produce a second intermediate frequency signal; and means for retrieving a digitally modulated version of program material from the first intermediate frequency signal, retrieving an analog modulated version of the program material from the second intermediate frequency signal, making a determination of the quality of the digitally modulated version of the program material, and using the quality determination to select the analog modulated version of the program material, the digitally modulated version of the program material, or a combination of the analog modulated version of the program material and the digitally modulated version of the program material as an output signal.

* * * * *

UNITED STATES PATENT AND TRADEMARK OFFICE
CERTIFICATE OF CORRECTION

PATENT NO. : 7,221,688 B2  
APPLICATION NO. : 10/210143  
DATED : May 22, 2007  
INVENTOR(S) : Philip H. Vanness It is certified that error appears in the above-identified patent and that said Letters Patent is hereby corrected as shown below:

Title Page, Item (56)
Other Publications

"System for Digital Sound Broadcasting in the Broadcasting Bands Below   MHz," Draft New Recommendations ITU-R BS, International Telecommunication Union, Radiocommunication Study Groups, Oct. 25, 2000, pp.1-30"

should read

--"System for Digital Sound Broadcasting in the Broadcasting Bands Below 30 MHz," Draft New Recommendations ITU-R BS, International Telecommunication Union, Radiocommunication Study Groups, Oct. 25, 2000, pp. 1-30--

Signed and Sealed this

Twenty-first Day of August, 2007

JON W. DUDAS  
*Director of the United States Patent and Trademark Office*